(12) United States Patent
Oakley

(10) Patent No.: US 7,589,711 B2
(45) Date of Patent: Sep. 15, 2009

(54) USER INTERFACE DEVICE WITH DOUBLE SENSOR INPUT TO CAPTURE ROTATION

(75) Inventor: Nicholas W. Oakley, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 676 days.

(21) Appl. No.: 11/018,223

(22) Filed: Dec. 20, 2004

(65) Prior Publication Data

US 2006/0132438 A1 Jun. 22, 2006

(51) Int. Cl.
G09G 5/08 (2006.01)
(52) U.S. Cl. .................. 345/163; 345/166; 345/173; 345/179
(58) Field of Classification Search ............ 345/163, 345/166, 173, 179
See application file for complete search history.

(56) References Cited

U.S. PATENT DOCUMENTS

| 6,974,947 B2* | 12/2005 | Black et al. | 250/221 |
| 2001/0050673 A1* | 12/2001 | Davenport | 345/163 |
| 2003/0197680 A1* | 10/2003 | Davenport | 345/163 |

FOREIGN PATENT DOCUMENTS

JP 2002-149334 * 5/2002

* cited by examiner

*Primary Examiner*—Richard Hjerpe
*Assistant Examiner*—Leonid Shapiro
(74) *Attorney, Agent, or Firm*—Robert A. Diehl

(57) ABSTRACT

Embodiments of the present invention provide a user interface device that can capture motion in more than two degrees of freedom at a time. More specifically, embodiments of the present invention can include multiple sensors so that, in addition to xy motion, rotational motion can be captured.

6 Claims, 10 Drawing Sheets

USER INTERFACE DEVICE WITH DOUBLE SENSOR INPUT TO CAPTURE ROTATION

FIELD OF THE INVENTION

The present invention relates to the field of user interface devices. More specifically, the present invention relates to user interface devices with to sensors to capture rotation.

BACKGROUND

A variety of user interface devices have been developed to help users interact with electronic devices, such as computers, personal data assistants (PDAs), cell phones, global positioning units (GPSs), etc. A mouse is probably to most common of these interfaces. A mouse often includes a track ball or optical sensor to detect motion over a surface. Hardware and/or software can capture the sensor input and translate the motion to an image on a display. For example, with a mouse, a user may be able to move a cursor or pointer, "click-and-drag" an icon or graphical representation of an object, move about in a virtual environment, etc. In each of these cases, however, motion is usually constrained to just two degrees of freedom at a time. That is, a mouse can usually only capture motion in two directions over a surface.

BRIEF DESCRIPTION OF DRAWINGS

Examples of the present invention are illustrated in the accompanying drawings. The accompanying drawings, however, do not limit the scope of the present invention. Similar references in the drawings indicate similar elements.

DETAILED DESCRIPTION OF THE INVENTION

In the following description, numerous specific details are set forth in order to provide a thorough understanding of the present invention. However, those skilled in the art will understand that the present invention may be practiced without these specific details, that the present invention is not limited to the depicted embodiments, and that the present invention may be practiced in a variety of alternative embodiments. In other instances, well known methods, procedures, components, and circuits have not been described in detail.

Parts of the description will be presented using terminology commonly employed by those skilled in the art to convey the substance of their work to others skilled in the art. Also, parts of the description will be presented in terms of operations performed through the execution of programming instructions. It is well understood by those skilled in the art that these operations often take the form of electrical, magnetic, or optical signals capable of being stored, transferred, combined, and otherwise manipulated through, for instance, electrical components.

Various operations will be described as multiple discrete steps performed in turn in a manner that is helpful for understanding the present invention. However, the order of description should not be construed as to imply that these operations are necessarily performed in the order they are presented, nor even order dependent. Lastly, repeated usage of the phrase "in one embodiment" does not necessarily refer to the same embodiment, although it may.

Embodiments of the present invention provide a user interface device that can capture motion in more than two degrees of freedom at a time. More specifically, embodiments of the present invention can include multiple sensors so that, in addition to xy motion, rotational motion can be captured.

Figure 1:
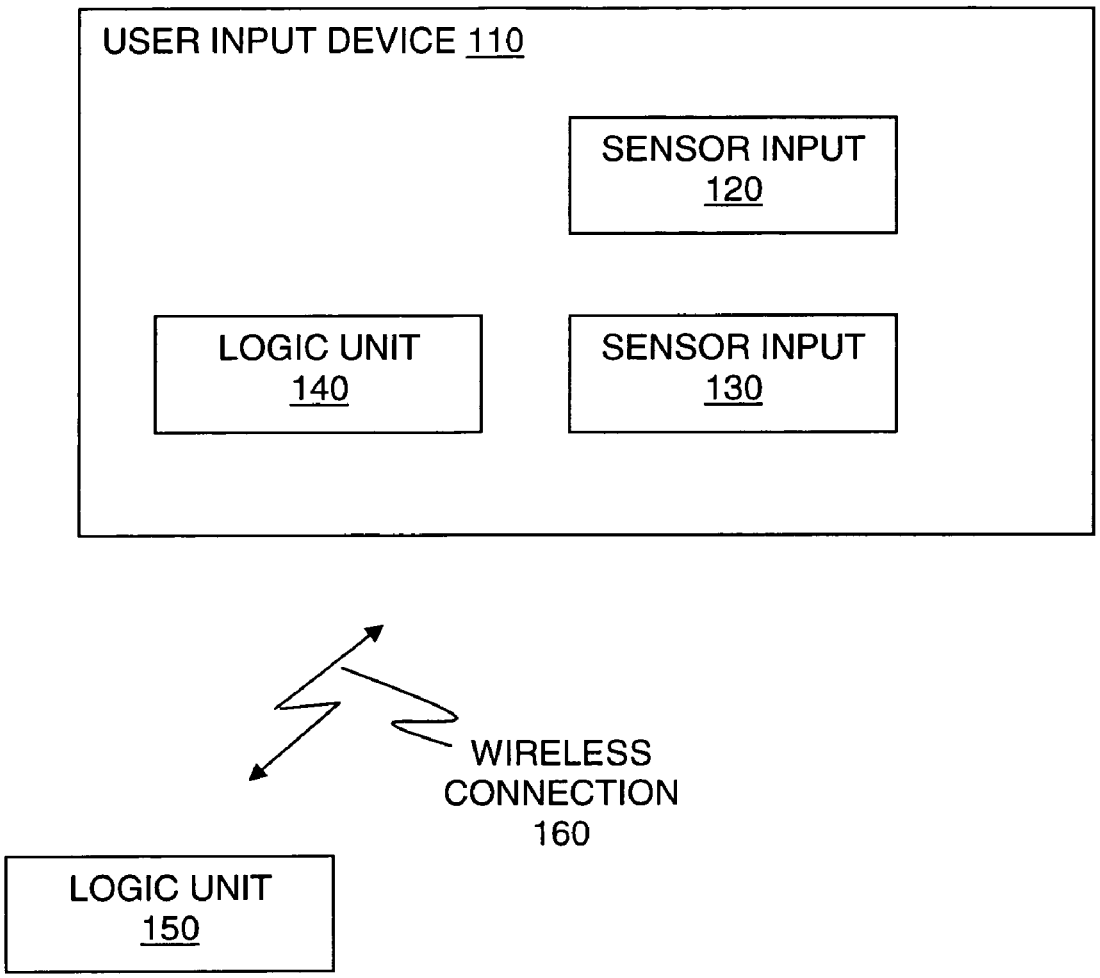
FIG. 1 illustrates a block diagram of one embodiment of the present invention.

FIG. 1 illustrates one embodiment of a block diagram of the present invention. The illustrated embodiment includes a user input device 110 that has two sensor inputs 120 and 130. Sensor inputs 120 and 130 can independently capture indications of motion. A logic unit 140 can determine rotational motion based on the relative motions indicated by the two sensor inputs.

In alternate embodiments, the logic unit 140 does not need to be included in user input device 110. For instance, as shown in FIG. 1, a logic unit 150 could be placed outside device 110 so long as it is communicatively coupled with the sensor inputs 120 and 130. The illustrated embodiment shows a wireless connection 160 between logic unit 150 and sensor inputs 120 and 130. Other embodiments could include a wired connection.

The input device 110 and sensor inputs 120 and 130 can be packaged in any of a number of different ways. FIGS. 2, and 5-9 illustrate a number of possibilities. Any number of other embodiments are also possible.

Figure 2:
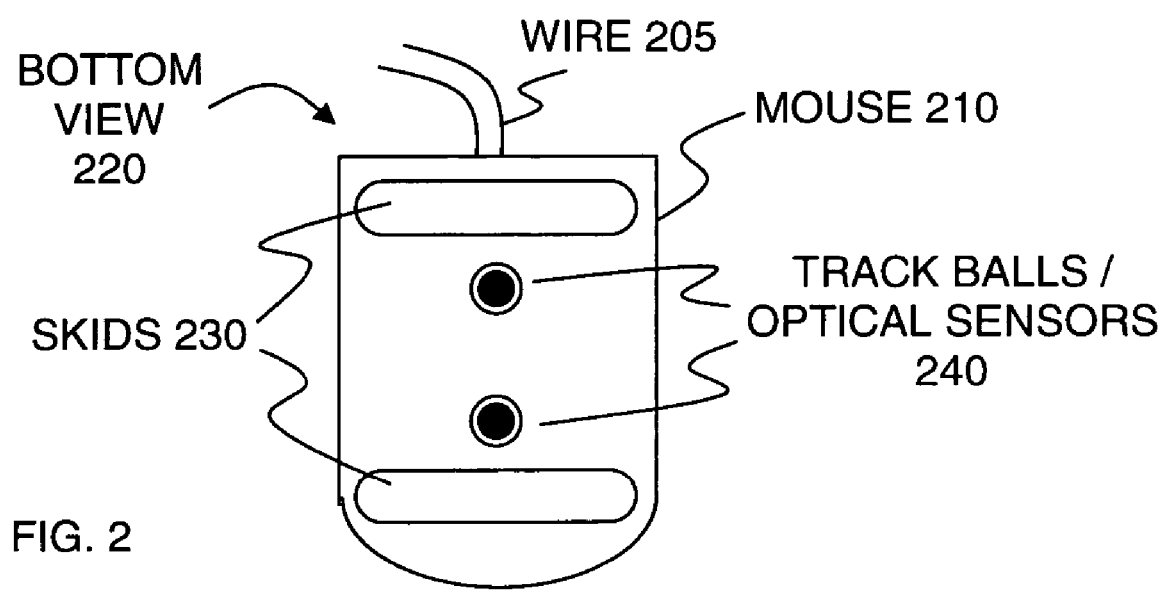
FIG. 2 illustrates one embodiment of a mouse.

FIG. 2 illustrates a bottom view 220 of one embodiment of a mouse 210. Mouse 210 has the familiar elongated form factor to fit into the hand of a user, with a communications wire 205 coming out of one end and skids 230 to help the mouse slide more easily over a surface. Rather than a single motion sensor however, mouse 210 includes two motions sensors 240. Any type of motion sensor could be used, such as two track balls or optical sensors, or a combination of one track ball and one optical sensor.

Figure 3:
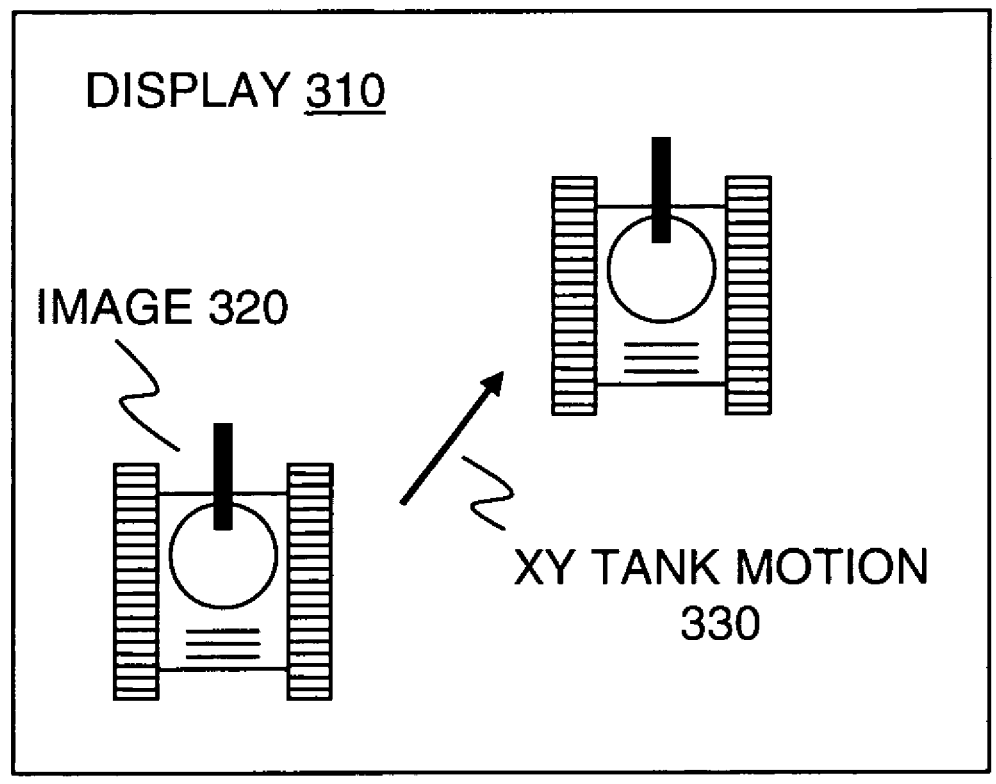
FIG. 3 illustrates one embodiment of xy motion.
Figure 3:
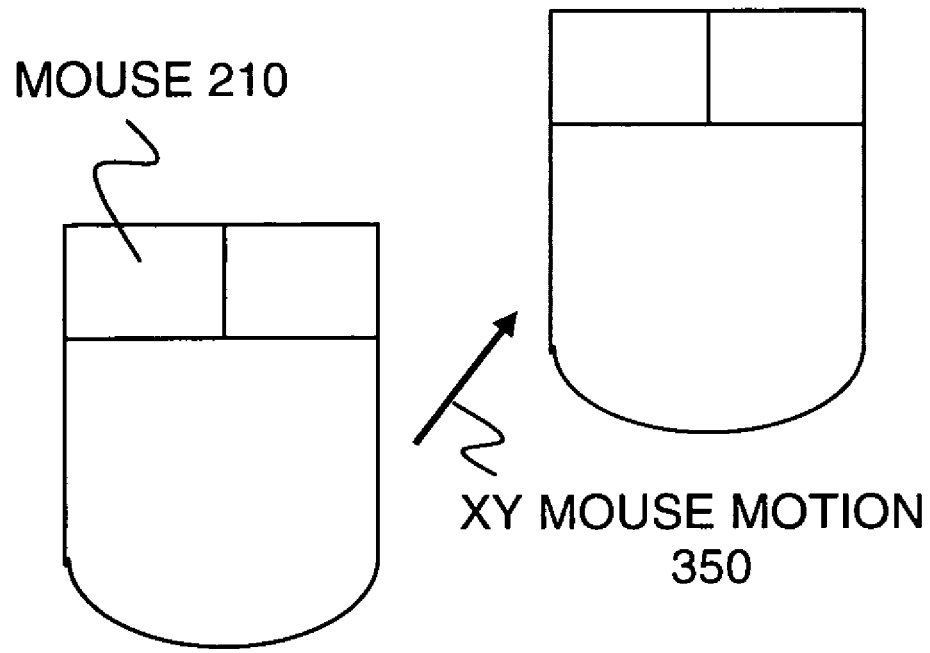
Figure 4:
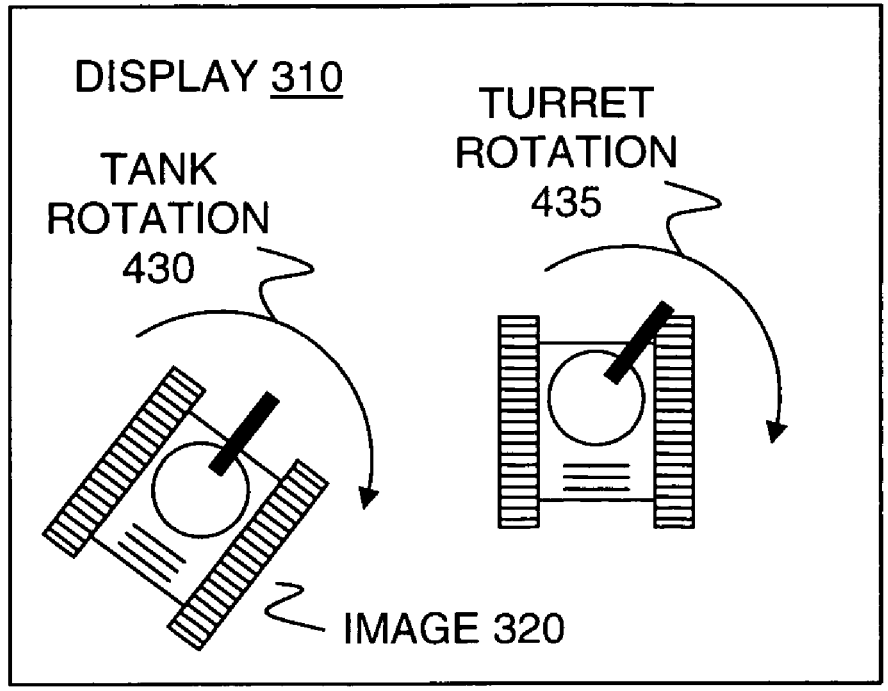
FIG. 4 illustrates one embodiment of rotational motion.
Figure 4:
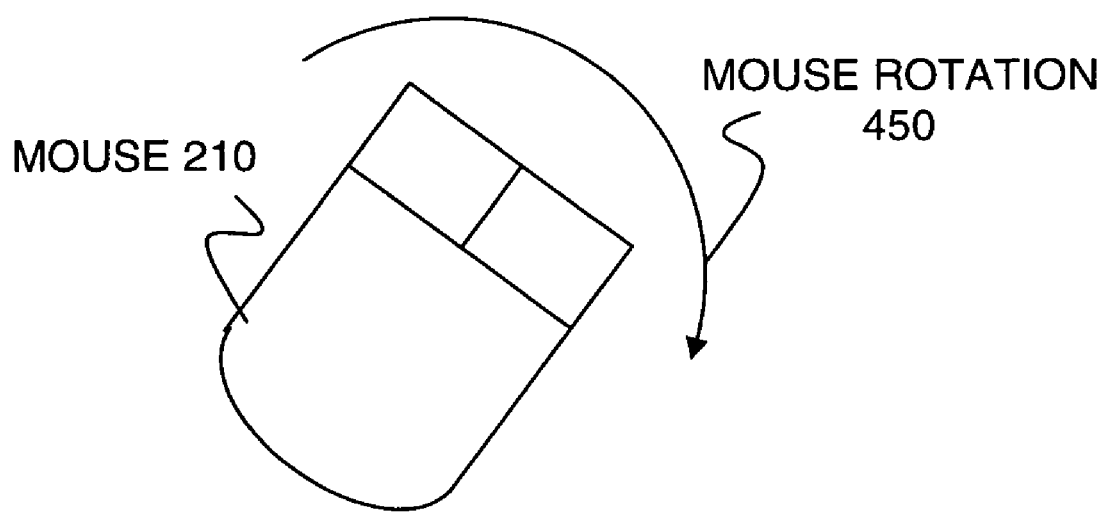

FIGS. 3 and 4 illustrate examples of how mouse 210 could be used to move an image 320 of an army tank in a display 310. FIG. 3 shows an example of capturing xy motion. That is, if mouse 210 is moved over a surface so that both sensor inputs detect equivalent xy mouse motion 350, then image 320 can be moved by a corresponding xy tank motion 330. The sensor inputs may be equivalent if, for example, the amount of motion indicated by one sensor is within some margin of the amount of motion indicated by the other sensor.

FIG. 4 shows examples of rotational motion. If mouse 210 is rotated over a surface so that the sensor inputs indicate a relative mouse rotation 450, then image 320 can be moved by a corresponding tank rotation 430. Of course, the additional degree of freedom that rotational mouse motion provides can be used in a wide variety of ways, and may be particularly useful in 2D graphics, 3D modeling, rendering, and gaming. For example, rather than rotating the entire image 320, the mouse rotation 450 could be used for turret rotation 435 independent of the xy motion of the rest of the tank.

The familiar elongated form factor of most mice may not be the most convenient approach for capturing rotational motion. For instance, in order to avoid an awkward or uncomfortable hand position following a rotation, a user may need to lift up a mouse so it does not detect motion, straighten the user's hand position, and set the mouse back down.

Figure 5:
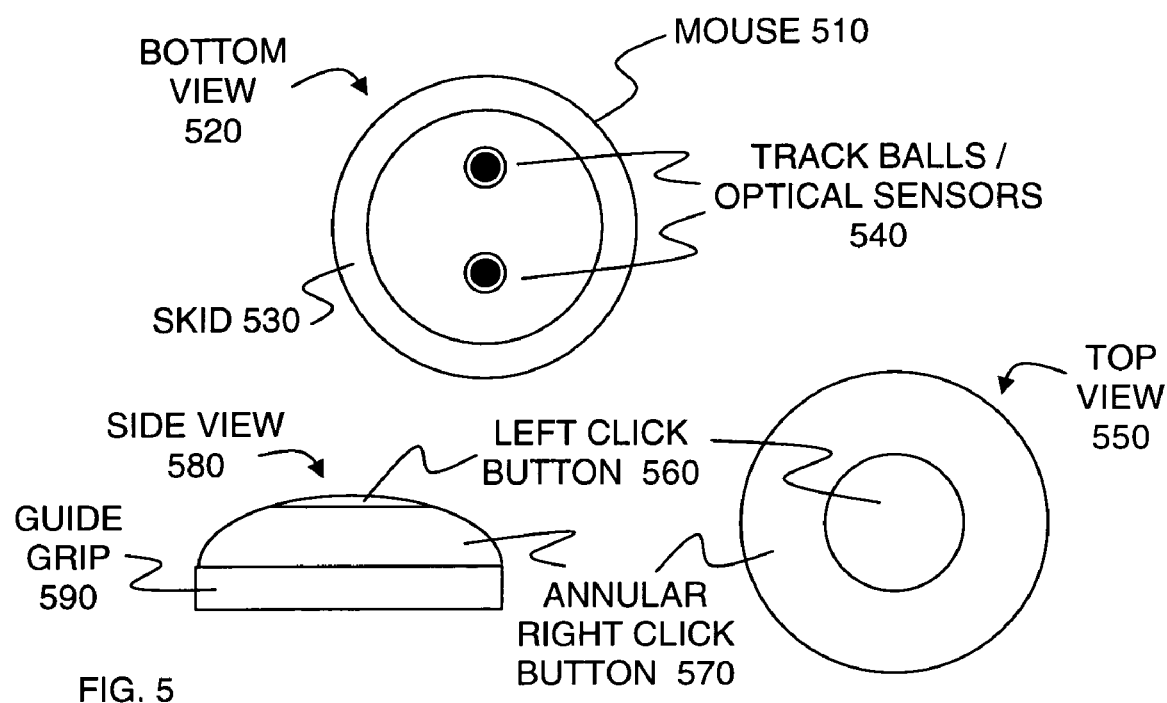
FIG. 5 illustrates one embodiment of a circular mouse.

FIG. 5 illustrates one embodiment of a wireless mouse 510 that may be better suited for capturing rotational motion. Mouse 510 has a substantially circular and symmetric form factor. That is, no matter what direction the mouse is rotated, a user's hand position can remain largely unchanged. Bottom view 520 shows skid 530 and a pair of sensors 540. Side view 580 shows a guide grip 590, which a user can grab from either side, for instance, using a thumb and third and fourth fingers. With this grip, a user can move the entire mouse 510 in xy directions, as well as spin the mouse in clockwise and counter-clockwise rotations.

A mouse usually includes a left click button and a right click button. The side view 580 and top view 550 show an example of how equivalent click buttons could be arranged on circular mouse 510. That is, the left click button 560 could be a circular button at the center of the top of the mouse. The right click button 570 could be an annular button that surrounds the left click button. No matter what rotational position the mouse 510 is in, a user could rest an index finger on the left click button and a second finger on the annular right click button.

In an alternate embodiment, the annular right click button could be the enclosure of the mouse, with the guide grip 590 providing a foot underneath the enclosure. That is, in order to click the right click button, a user could push down on the mouse enclosure so that the guide grip foot would tuck up under the mouse enclosure.

Figure 6:
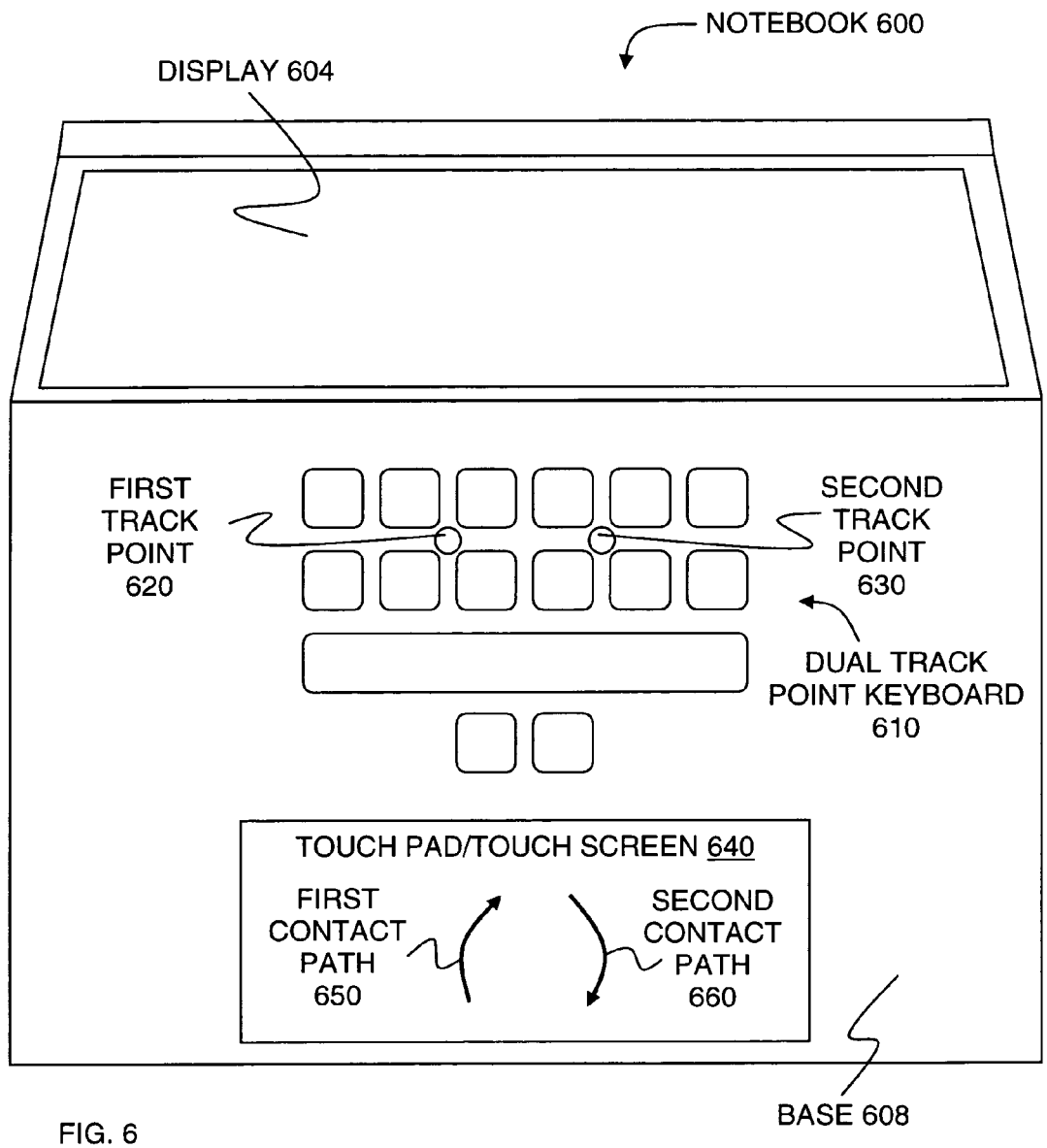
FIG. 6 illustrates one embodiment of a notebook computer.

FIG. 6 illustrates two embodiments of how the present invention could be used in a notebook computer 600. FIG. 6 shows a view of notebook 600 looking down from above with the display 604 open. On the base 608, a portion of the keyboard 610 is shown including dual track points, a first track point 620 and a second track point 630. The track points 620 and 630 could be used to capture xy motion moving them substantially in unison, or by moving just one of them at a time. Rotational motion could be captured by moving the track points 620 and 630 in opposite directions simultaneously. In one embodiment, the two track points could be used much like the two-stick steering mechanism common among tracked vehicles, like bulldozers and army tanks, to move and rotate images on display 604.

Base 608 also includes a touch surface 640, such as a touch pad or touch screen. The touch surface 640 can track multiple contact paths simultaneously, such as a first contact path 650 and a second contact path 660. Motion in xy directions can be captured using a single contact path, or multiple contact paths substantially in unison. Rotational motion can be captured by using contact paths in opposition, as shown by the directional arrows of paths 650 and 660.

Figure 7:
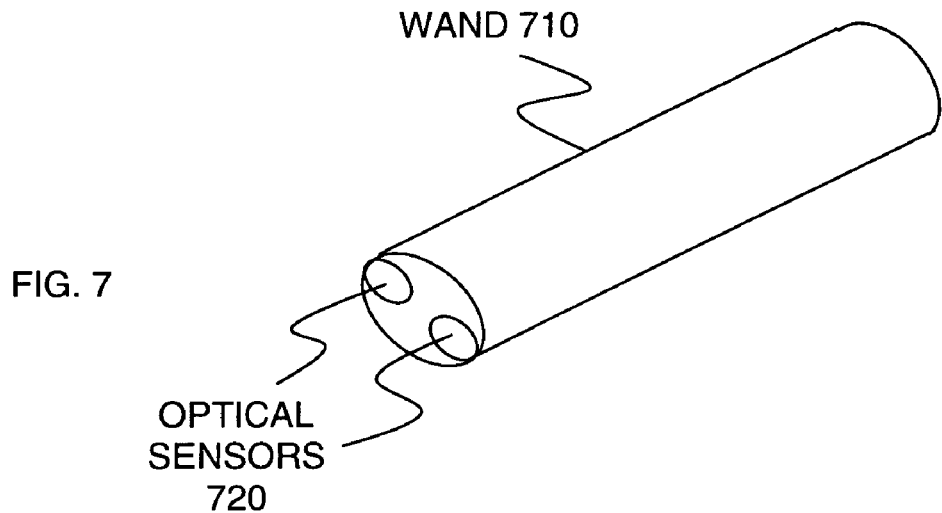
FIG. 7 illustrates one embodiment of a wand.

FIG. 7 illustrates one embodiment of a light wand, or light pen, 710 that can capture xy and rotational motion using two optical sensors 720 over a surface. That is, rotational motion can be captured by twisting the light wand 710.

Figure 8:
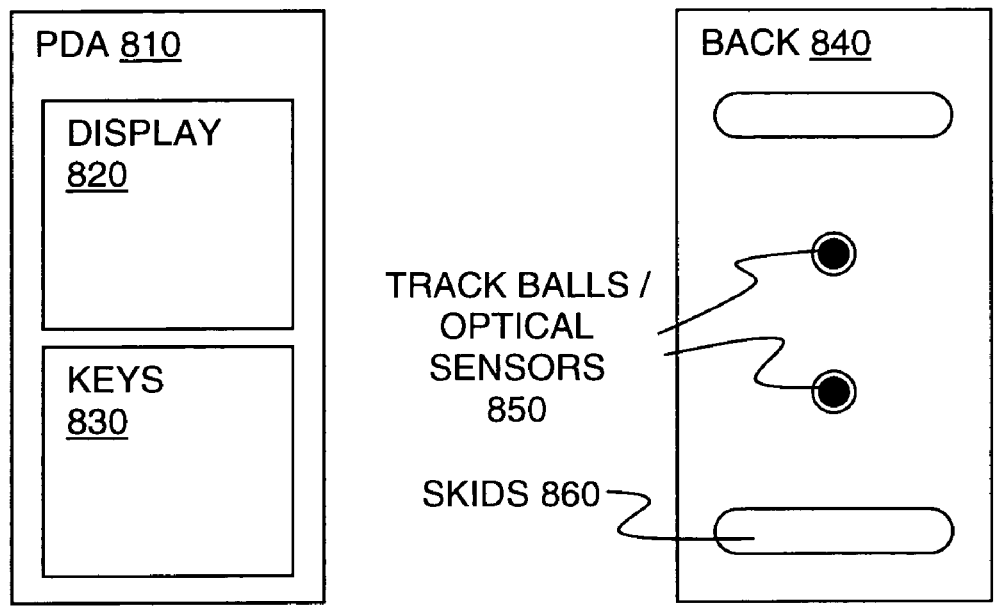
FIG. 8 illustrates one embodiment of a personal data assistant (PDA).

FIG. 8 illustrates one embodiment of a personal data assistant (PDA) 810 that can capture xy and rotational motion. PDA 810 includes a display 820 and keys 830. Keys 830 may include directional keys or track points for navigating menus or moving a cursor on display 820 much like keyboard 610 in FIG. 6. Display 820 could also be a touch screen that can capture both xy and rotation motion much like touch surface 640 in FIG. 6.

PDA 810, however, also includes skids 860 and sensor inputs 850 on its back side 840. In which case, PDA 810 can be placed on a surface and used much like a mouse to maneuver an image in display 820 in xy and rotational directions. For example, PDA 810 could include global positioning satellite (GPS) features, with a segment of a map shown in display 820. A user may be able to move about and rotate the map in the display by moving the PDA over a surface.

Figure 9:
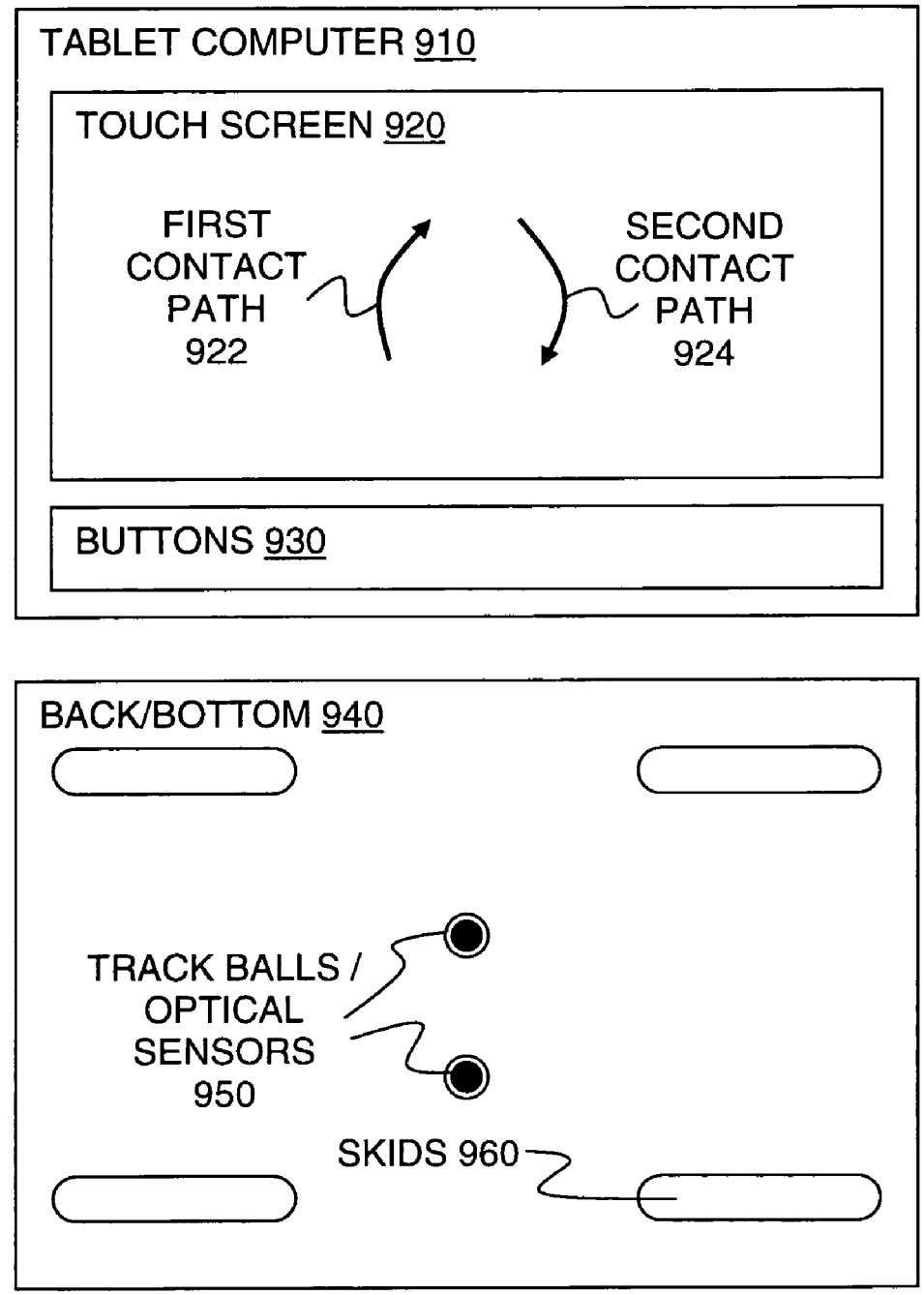
FIG. 9 illustrates one embodiment of a tablet computer.

FIG. 9 illustrates one embodiment of a tablet computer 910 that can capture xy and rotational motion. Tablet 910 includes buttons 930, that could include dual track points like keyboard 610 in FIG. 6. Tablet 910 also includes a touch screen 920. As with the touch surface 640 in FIG. 6, touch screen 920 could track multiple contact paths simultaneously, such as the first contact path 922 and the second contact path 924.

In an alternate embodiment, rather than, or in addition to, providing buttons 930 on the tablet, the chassis of the tablet could envelope a base with sensors to detect the equivalent of button clicks when the chassis is tilted with respect to the base. For example, rather like using the circular mouse enclosure for the right click button as described above, tilting the chassis by pushing down on the left side could be equivalent to a left click and tilting the chassis by pushing down on the right side could be equivalent to right click. A similar chassis-and-base mechanism could also be used for an alternate embodiment of the PDA described in FIG. 8.

On the back, or bottom, side 940 of tablet 910, the tablet could also include skids 960 and dual sensor inputs 950. Much like the PDA of FIG. 8, tablet 910 could be moved and rotated like a mouse to maneuver an image in display 920.

Figure 10:
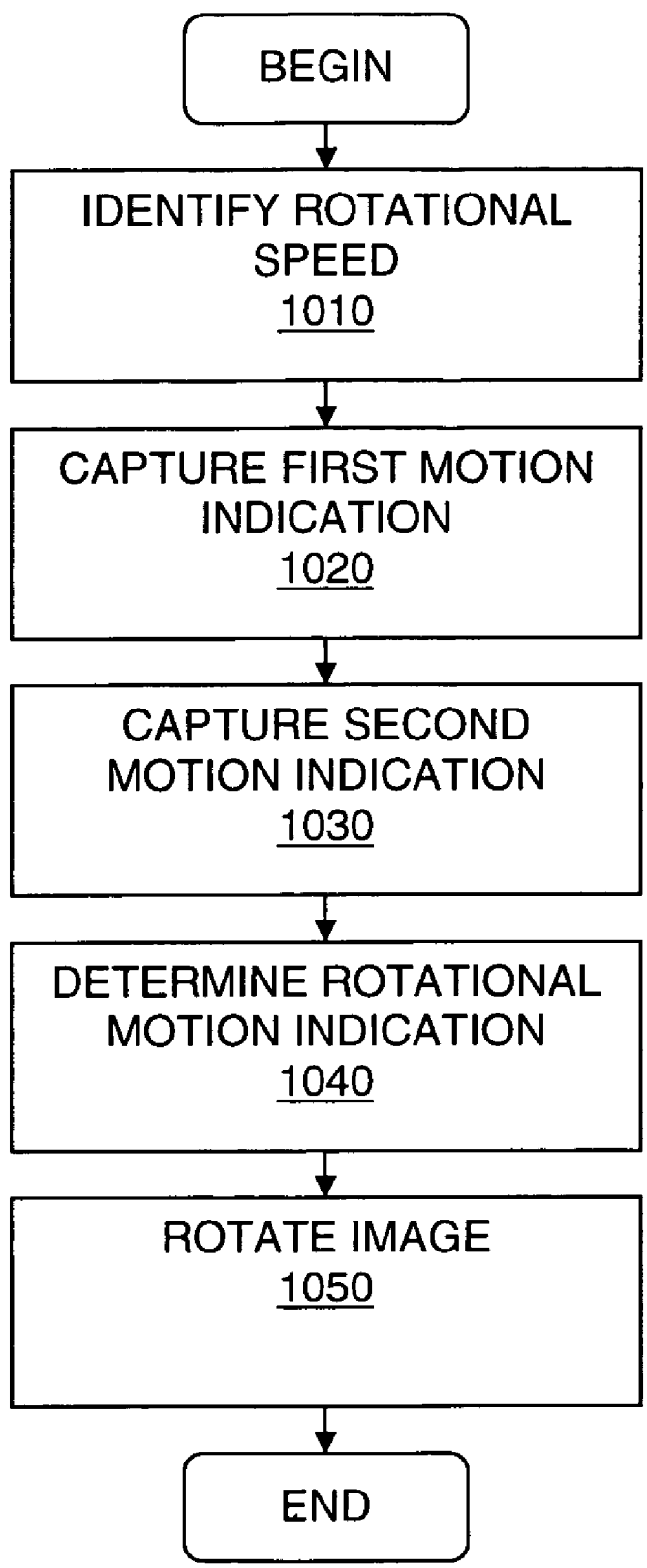
FIG. 10 illustrates a method of one embodiment of the present invention.

FIG. 10 illustrates one embodiment of a method for capturing rotational motion. At 1010, the method can identify a rotational speed. For example, much like a user can set a preference for how fast a pointer moves in a display relative to mouse motion, a user may also be able to set a preference for how fast an image rotates relative to mouse rotation. A rotational speed could be specified as a ratio of an angular displacement as indicated by two sensor inputs to an angular displacement of a displayed image. In other words, rotational speed could be specified as some multiple of the detected angular displacement.

At 1020, the method can capture a first motion indication from a first sensor input, and, at 1030, the method can capture a second motion indication from a second sensor input. Capturing the indications of motion can include the actual functions of the sensors on a user input device. Or, capturing the indications could simply involve receiving the indications of motion from the sensor inputs at, for instance, a remote device.

At 1040, based on the relative different in motion between the two motion indications, the method can determine a rotational motion indication. Then, at 1050, the method can rotate an image in a display based on the rotational motion indication and the rotational speed.

In some embodiments, the entire method of FIG. 10 could be performed within a user input device, such as a PDA or notebook computer. Alternately, part of the method could be performed in a user input device, such as a wireless mouse, and part of the method could be performed in a device that is communicatively coupled to a user input device, such as a desktop computer. In yet another embodiment, a device that is communicatively coupled to a user input device, such as a computer, could perform all of the functions in the method. For instance, where capturing the indications of motion comprises receiving the indications of motion for the user input device, the entire method could be preformed in a computer that is connected to a mouse.

FIGS. 2-10 illustrate a number of implementation specific details. Other embodiments may not include all the illustrated elements, may arrange the elements differently, may combine one or more of the elements, may include additional elements, and the like.

Figure 11:
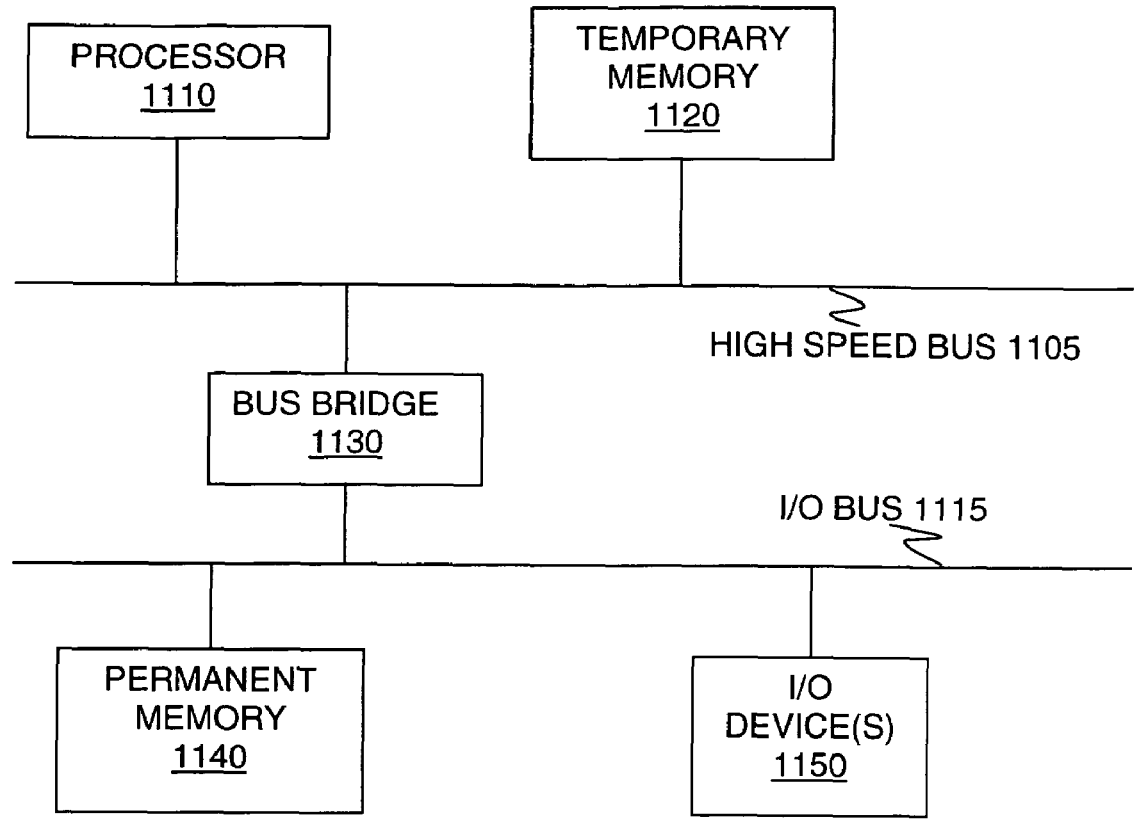
FIG. 11 illustrates one embodiment of a hardware system that can perform various functions of the present invention.

FIG. 11 illustrates one embodiment of a generic hardware system that can bring together the functions of various embodiments of the present invention. In the illustrated embodiment, the hardware system includes processor 1110 coupled to high speed bus 1105, which is coupled to input/output (I/O) bus 1115 through bus bridge 1130. Temporary memory 1120 is coupled to bus 1105. Permanent memory 1140 is coupled to bus 1115. I/O device(s) 1150 is also coupled to bus 1115. I/O device(s) 1150 may include a display device, a keyboard, one or more external network interfaces, etc.

Certain embodiments may include additional components, may not require all of the above components, or may combine one or more components. For instance, temporary memory 1120 may be on-chip with processor 1110. Alternately, permanent memory 1140 may be eliminated and temporary memory 1120 may be replaced with an electrically erasable programmable read only memory (EEPROM), wherein software routines are executed in place from the EEPROM. Some implementations may employ a single bus, to which all of the components are coupled, while other implementations may include one or more additional buses and bus bridges to which various additional components can be coupled. Similarly, a variety of alternate internal networks could be used including, for instance, an internal network based on a high speed system bus with a memory controller hub and an I/O controller hub. Additional components may include additional processors, a CD ROM drive, additional memories, and other peripheral components known in the art.

Figure 12:
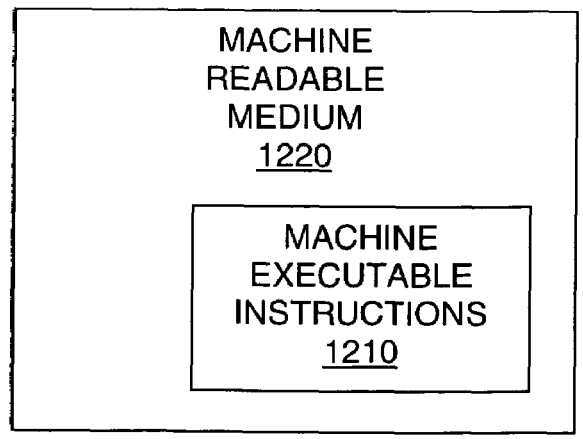
FIG. 12 illustrates one embodiment of a machine readable medium to store instructions that can implement various functions of the present invention.

Various functions of the present inventions, as described above, can be implemented using one or more of these hardware systems. In one embodiment, the functions may be implemented as instructions or routines that can be executed by one or more execution units, such as processor 1110, within the hardware system(s). As shown in FIG. 12, these machine executable instructions 1210 can be stored using any machine readable storage medium 1220, including internal memory, such as memories 1120 and 1140 in FIG. 11, as well as various external or remote memories, such as a hard drive, diskette, CD-ROM, magnetic tape, digital video or versatile disk (DVD), laser disk, Flash memory, a server on a network, etc. In one implementation, these software routines can be written in the C programming language. It is to be appreciated, however, that these routines may be implemented in any of a wide variety of programming languages.

In alternate embodiments, various functions of the present invention may be implemented in discrete hardware or firmware. For example, one or more application specific integrated circuits (ASICs) could be programmed with one or more of the above described functions. In another example, one or more functions of the present invention could be implemented in one or more ASICs on additional circuit boards and the circuit boards could be inserted into the computer(s) described above. In another example, one or more programmable gate arrays (PGAs) could be used to implement one or more functions of the present invention. In yet another example, a combination of hardware and software could be used to implement one or more functions of the present invention.

Thus, user interface devices with to sensors to capture rotation are described. Whereas many alterations and modifications of the present invention will be comprehended by a person skilled in the art after having read the foregoing description, it is to be understood that the particular embodiments shown and described by way of illustration are in no way intended to be considered limiting. Therefore, references to details of particular embodiments are not intended to limit the scope of the claims.

What is claimed is:

1. An apparatus comprising:
   a user input device comprising a wireless mouse having a substantially circular-symmetric shape with
      an annular click button,
      a circular click button located within the annular click button, and
      a guide grip around a perimeter of the wireless mouse,
      said annular click button, circular click button, and guide grip positioned to receive a typical user hand size, with a thumb and a third or fourth finger holding the guide grip on substantially opposite sides of the wireless mouse, and with an index finger and a middle finger in uniform relation to the annular click button and the circular click button regardless of a rotational position of the wireless mouse;
   a first sensor input on the user input device to capture a first motion indication;
   a second sensor input on the user input device to capture a second motion indication; and
   a logic unit to determine a rotational motion indication based at least in part on a relative motion of the first motion indication and the second motion indication.

2. The apparatus of claim 1 wherein the first sensor input and the second sensor input are each selected from a group comprising a track ball and an optical sensor.

3. The apparatus of claim 1 wherein the logic unit is selected from a group comprising a circuit within the user input device, a circuit external to the user input device, and software to be executed by a processor.

4. A system comprising:
   a notebook computer;
   a user input device coupled with the notebook computer, said user input device comprising a wireless mouse having a substantially circular-symmetric shape with
      an annular click button
      a circular click button located within the annular click button, and
      a guide grip around a perimeter of the wireless mouse,
      said annular click button, circular click button, and guide grip positioned to receive typical user hand size, with a thumb and a third or fourth finger holding the guide grip on substantially opposite sides of the wireless mouse, and with an index finger and a middle finger in uniform relation to the annular click button and the circular click button regardless of a rotational position of the wireless mouse;
   a first sensor input on the user input device to capture a first motion indication;
   a second sensor input on the user input device to capture a second motion indication; and
   a logic unit to determine, a rotational motion indication based at least in part on a relative motion of the first motion indication and the second motion indication.

5. The system of claim 4 wherein the first sensor input and the second sensor input are each selected from a group comprising a track ball and an optical sensor.

6. The system of claim 4 wherein the logic unit is selected from a group comprising a circuit within the user input device, a circuit external to the user input device, and a processor within the notebook computer executing software.

* * * * *